United States Patent Office 2,909,569
Patented Oct. 20, 1959

2,909,569

CHLOROBENZYLATED-INDANOLS

Seymour L. Shapiro, Hastings on Hudson, and Louis Freedman, Bronxville, N.Y., assignors to U.S. Vitamin & Pharmaceutical Corporation, a corporation of Delaware No Drawing. Application January 17, 1958
Serial No. 709,458

6 Claims. (Cl. 260—619)

This invention relates to chlorobenzylated derivatives of 4- and 5-indanols and includes correlated discoveries for providing novel compounds having useful characteristics.

The compounds of this invention are chlorobenzylated-indanols and may be represented by the following formulae

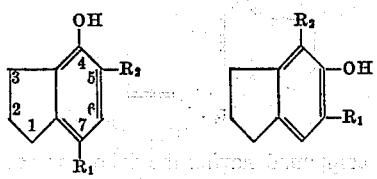

wherein $R_1$ is selected from the group consisting of monochlorobenzyl and dichlorobenzyl, and $R_2$ is selected from the group consisting of hydrogen, monochlorobenzyl and dichlorobenzyl.

These compounds are particularly effective against organisms which synthesize their own vitamin $B_{12}$ and evaluation has been made for their capacity to inhibit the growth of a standard vitamin $B_{12}$ producing organism, Bacillus megatherium. As a control, comparison was made with 2,4,5-trichlorophenol, a compound whose tumor curative properties in mice has been ascribed to its anti-vitamin $B_{12}$ properties. It has been established that representative chlorobenzylated indanols of this invention are 200–500% more effective in inhibiting the growth of the vitamin $B_{12}$ producing organism than is 2,4,5-trichlorophenol.

The results of such investigations, along with the method of testing have been described in Table I.

TABLE I

*Growth inhibition of B. megatherium by chlorobenzylated indanols[1]*

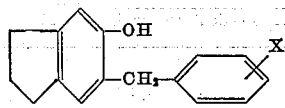

| | Position of substituents | | Minimum inhibitory concentration in micromoles/liter |
|---|---|---|---|
| 4-OH | 7-(2-chlorobenzyl) | | 13 |
| 4-OH | 7-(4-chlorobenzyl) | | 13 |
| 4-OH | 7-(2,4-dichlorobenzyl) | | 16 |
| 4-OH | 7-(3,4-dichlorobenzyl) | | 31 |
| 5-OH | 6-(2-chlorobenzyl) | | 13 |
| 5-OH | 6-(4-chlorobenzyl) | | 25 |
| 5-OH | do | 4-(4-chlorobenzyl) | 31 |
| 5-OH | 6-(2,4-dichlorobenzyl) | 4-(2,4-dichlorobenzyl) | 16 |
| 5-OH | 6-(3,4-dichlorobenzyl) | 4-(3,4-dichlorobenzyl) | 16 |
| Control for comparison. | 2,4,5-trichlorophenol | | 70 |

[1] The benzylated indanols solubilized as the sodium salts were diluted to a concentration estimated to give a good end point in the test. Such concentrations were previously established by a rough screening. The pH of the solution should be adjusted to 6. A series of 10 tubes (22 x 175 mm.) were prepared containing 5 ml. of distilled water. A five ml. aliquot of the test solution was added to the first tube. After mixing, a 5 ml. portion was removed from this tube and transferred to the second tube. The process was continued until the last tube from which the 5 ml. portion was removed, was discarded. All tubes now contain 5 ml. of the serially diluted test solution. A 5 ml. aliquot of double strength medium (J. C. Lewis, K. Ijichi, N. S. Snell and J. A. Garabaldi, U.S. Dept. of Agriculture, Publication AIC-254 (1949)), was added to each tube. Control tubes were prepared containing only water and culture medium. The tubes were covered and sterilized in an autoclave (121° C. at 15 lbs. pressure) for 15 minutes. After cooling, all tubes were inoculated with a washed culture of B. megatherium (American Type Culture Collection No. 10778) and stored and shaken at 30° C. until the control showed good growth (approximately 24 hours). The endpoint (minimum inhibiting concentration) was observed visually and was taken as the lowest concentration of test material in which no growth was discernible. As a control on the organism, with each run a series of dilutions of 2,4,5-trichlorophenol was similarly evaluated. The results have been expressed as the concentration in micromoles/liter (1/1,000,000 of a mole=1 micromole) preventing discernible growth.

In the practice of the invention an indanol is condensed with a chlorobenzyl chloride. The unsubstituted indanols required as a reactant in the synthesis are commercially available (Carbide and Carbon, Inc.). The corresponding chlorobenzylated indanols are readily prepared using the required chlorobenzyl halide with zinc chloride as a condensing agent. The exact position of the entering chlorobenzyl group has not been ascertained. However, in the zinc chloride catalyzed benzylation of a phenol, entry is preferably in the para position, and for the mono-(chlorobenzyl)-4-indanol, the product is believed to be 7-(chlorobenzyl)-4-indanol as shown in the formula below.

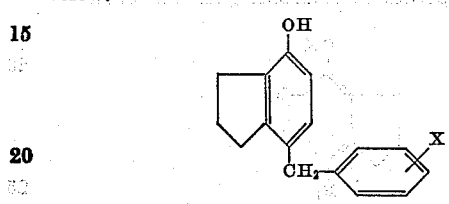

X represents chlorine in one or two positions of the benzene ring to which it is attached.

Alternatively, in the case of the mono-(chlorobenzyl)-5-indanol, since the para position is occupied by one of the elements of the ring attached to the benzene nucleus, the initial entering chlorobenzyl group occupies a position ortho to the phenolic hydroxyl and we believe that the more sterically accessible 6-position is attacked to give 6-(chlorobenzyl)-5-indanol as shown in the formula below.

In the course of these chlorobenzylations, dichlorobenzylated products are obtained and in the case of the 4-indanol, consideration of the pertinent prior art in phenol chemistry would indicate that the 5,7-di-(chlorobenzyl)-4-indanol is formed, and for the 5-indanol there is obtained 4,6-di-(chlorobenzyl)-5-indanol.

It should be clear, however, that while these entering group assignments have at this point been made in terms of recognition of related mechanisms of the prior art, and that while the group assignments of the di-(chlorobenzylated)-indanols can be made with fair certainty, the alternative structures to those given above for the monobenzylated indanols, namely, 5-(chlorobenzyl)-4-indanol (from the 4-indanol) and 4-(chlorobenzyl)-5-indanol (from the 5-indanol) are distinct possibilities.

As an illustrative embodiment of the manner in which the compounds of the invention are made, the following general example is presented.

EXAMPLE I

The compounds were all prepared by the same general procedure.

A mixture of 1 mole of the indanol, 0.6–1 mole of the chlorobenzyl chloride and 40–50 g. of anhydrous zinc chloride in about 500 ml. of chloroform was stirred and refluxed for 12 hours. The cooled reaction mixture was washed with about 2 liters of water, the chloroform phase containing the products was separated, dried over anhydrous magnesium sulfate, filtered and subjected to fractional vacuum distillation. After removal of chloroform and unreacted indanol, the oily residue of product was separable into two main fractions: the mono-(chlorobenzylated)-indanol and the higher boiling di-(chlorobenzylated)-indanol.

In Table II, which follows, the physical properties of the products are given. The description of $R_1$ indicates the reactant chlorobenzyl halide used. Thus, if $R_1$ is 4-chlorobenzyl, the reactant for the particular synthesis was para-chlorobenzyl chloride.

TABLE II

*Physical properties of chlorobenzylated-indanols*

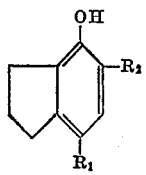

DERIVATIVES OF 4-INDANOL

| $R_1$ | $R_2$ | B.P., °C. | Mm. pressure | M.P., °C. |
|---|---|---|---|---|
| 2-chlorobenzyl | H | 162-178 | 0.16 | |
| Do | 2-chlorobenzyl | 194-202 | 0.04 | |
| 4-chlorobenzyl | H | 146-153 | 0.03 | 84-85 |
| Do | 4-chlorobenzyl | 226-232 | 0.1 | |
| 2,4-dichlorobenzyl | H | 180 | 0.06 | |
| Do | 2,4-dichlorobenzyl | 240-250 | 0.04 | |
| 3,4-dichlorobenzyl | H | 186-190 | 0.1 | 65-67 |
| Do | 3,4-dichlorobenzyl | 252-266 | 0.1 | 142 |

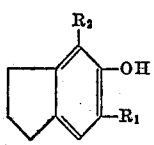

DERIVATIVES OF 5-INDANOL

| $R_1$ | $R_2$ | B.P., °C. | Mm. pressure | M.P., °C. |
|---|---|---|---|---|
| 2-chlorobenzyl | H | 162-170 | 0.04 | 79-82 |
| Do | 2-chlorobenzyl | 205-220 | 0.03 | |
| 4-chlorobenzyl | H | 138 | 0.05 | 73-74 |
| Do | 4-chlorobenzyl | 230 | 0.05 | 83-85 |
| 2,4-dichlorobenzyl | H | 186-196 | 0.08 | |
| Do | 2,4-dichlorobenzyl | 256-258 | 0.08 | |
| 3,4-dichlorobenzyl | H | 198-208 | 0.12 | |
| Do | 3,4-dichlorobenzyl | 256-260 | 0.2 | 78-80 |

It will thus be seen that the objects set forth above among those made apparent from the preceding description are efficiently attained, and since certain changes may be made in the above composition of matter without departing from the scope of the invention, it is intended that all matter contained in the above description shall be interpreted as illustrative and not in a limiting sense.

It is also understood that the following claims are intended to cover all of the generic and specific features of the invention herein described, and all statements of the scope of the invention, which as a matter of language might be said to fall therebetween.

Having described our invention, what we claim as new and desire to secure by Letters Patent is:

1. A composition of matter selected from the group consisting of chlorobenzylated indanols, said chlorobenzylated indanols having the structure

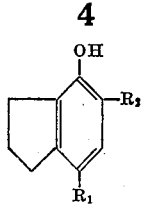

and

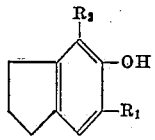

wherein $R_1$ is a member of the group consisting of o-chlorobenzyl, p-chlorobenzyl, 2,4-dichlorobenzyl and 3,4-dichlorobenzyl and $R_2$ is a member of the group consisting of hydrogen and $R_1$.

2. The compound having the following formula:

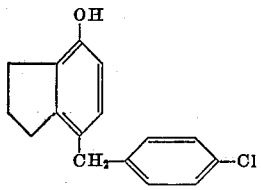

3. The compound having the following formula:

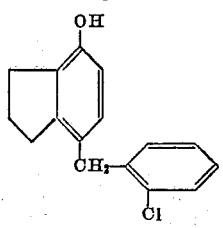

4. The compound having the following formula:

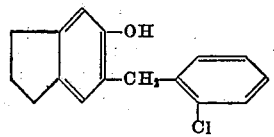

5. The compound having the following formula:

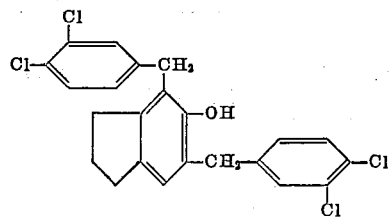

6. The compound having the following formula:

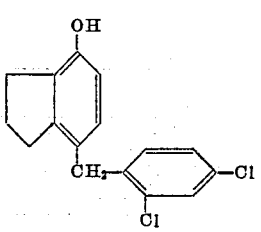

References Cited in the file of this patent

UNITED STATES PATENTS 1,967,825    Klarmann et al.    July 24, 1934

OTHER REFERENCES

Buu-Hoi et al.: 20 Jour. Org. Chem. (August 1955), pages 1129-34.